US009900568B2

(12) United States Patent
Muramatsu

(10) Patent No.: US 9,900,568 B2
(45) Date of Patent: Feb. 20, 2018

(54) REMOTE COMMUNICATION SYSTEM, METHOD FOR CONTROLLING REMOTE COMMUNICATION SYSTEM, AND STORAGE MEDIUM

(71) Applicant: CANON KABUSHIKI KAISHA, Tokyo (JP)

(72) Inventor: Yusuke Muramatsu, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/141,437

(22) Filed: Apr. 28, 2016

(65) Prior Publication Data

US 2016/0330406 A1 Nov. 10, 2016

(30) Foreign Application Priority Data

May 8, 2015 (JP) ................................ 2015-095888

(51) Int. Cl.
*H04N 9/31* (2006.01)
*H04N 7/14* (2006.01)

(52) U.S. Cl.
CPC ........... *H04N 9/3188* (2013.01); *H04N 7/142* (2013.01); *H04N 7/147* (2013.01); *H04N 9/3185* (2013.01); *H04N 9/3194* (2013.01)

(58) Field of Classification Search
USPC ..................................................... 348/14.08
See application file for complete search history.

(56) References Cited

U.S. PATENT DOCUMENTS

| 6,922,494 | B1 * | 7/2005 | Fay ......................... G01S 15/08 348/163 |
| 8,300,081 | B1 | 10/2012 | Sawyer |
| 8,994,775 | B2 * | 3/2015 | Lee ........................ H04N 7/142 345/156 |
| 9,030,520 | B2 | 5/2015 | Chu et al. |
| 9,363,476 | B2 | 6/2016 | Fish et al. |
| 2001/0026247 | A1 * | 10/2001 | Nishio ................... G03B 21/13 345/4 |
| 2009/0199078 | A1 | 8/2009 | Caspi et al. |
| 2012/0293606 | A1 | 11/2012 | Watson et al. |
| 2013/0050398 | A1 | 2/2013 | Krans et al. |
| 2013/0222521 | A1 | 8/2013 | Lee et al. |
| 2013/0335508 | A1 | 12/2013 | Mauchly |
| 2014/0063178 | A1 | 3/2014 | Krans et al. |
| 2015/0009278 | A1 | 1/2015 | Modai et al. |

(Continued)

FOREIGN PATENT DOCUMENTS

JP 11-75174 A 3/1999
JP 2008-191613 A 8/2008

*Primary Examiner* — Amal Zenati
(74) *Attorney, Agent, or Firm* — Canon USA, Inc. I.P. Division

(57) ABSTRACT

A remote communication system includes a projector that projects one or more images transmitted from a remote site onto a screen. The screen has at least one front camera thereon. A CPU performs an extraction process to extract a person part from each of the images captured by the front camera and a scaling process to scale the image(s) captured by the front camera in accordance with a distance from the front camera to a person serving as a subject. The remote communication system further includes a projector that projects the image(s) subjected to the extraction process and the scaling process onto a screen set in the remote site.

16 Claims, 8 Drawing Sheets

(56) References Cited

U.S. PATENT DOCUMENTS

| | | |
|---|---|---|
| 2015/0163400 A1 | 6/2015 | Geiss et al. |
| 2016/0080691 A1* | 3/2016 | Yarosh .................... H04N 7/15 348/14.08 |
| 2016/0260236 A1 | 9/2016 | Fogarty et al. |
| 2016/0328201 A1 | 11/2016 | Ito |
| 2016/0330407 A1 | 11/2016 | Okuma |

* cited by examiner

REMOTE COMMUNICATION SYSTEM, METHOD FOR CONTROLLING REMOTE COMMUNICATION SYSTEM, AND STORAGE MEDIUM

BACKGROUND OF THE INVENTION

Field of the Invention

The present disclosure relates to a remote communication system used to communicate with a remote site, a method for controlling the remote communication system, and a storage medium.

Description of the Related Art

Systems used to communicate with a communication partner located at a different place (a remote site) have been developed. For example, Japanese Patent Laid-Open No. 2008-191613 describes a remote conference system used to conduct a conference with a person located at a different place. The system described in Japanese Patent Laid-Open No. 2008-191613 includes a camera for capturing the image of a person, a projector for projecting an image, and a screen that displays the image projected by the projector.

According to the system described in Japanese Patent Laid-Open No. 2008-191613, the image of a person captured by a camera set in a conference room is projected onto a screen by a projector set at the other party's location (a remote site). In addition, the image of a person captured by a camera set at the other party's location is projected onto a screen by a projector in the conference room. Furthermore, according to the system described in Japanese Patent Laid-Open No. 2008-191613, by displaying a real-size image of a person, the realistic sensation of actually being in a conference room can be increased.

When several people physically located in the same space (e.g., the same room) simply communicate with one another, the people are generally standing and face one another at a distance of 1 to 2 m. If such a form of communication or a similar form of communication can be applied to communication with people in a remote site, the people can easily communicate with one another and understand one another.

As described in Japanese Patent Laid-Open No. 2008-191613, the real-size image of a person in a remote site can be displayed. However, if the person who is standing communicates with another person, the person may move during the communication. At that time, if the person moves in the right-left direction, the projected image does not cause a significant trouble. However, if the person moves in the front-rear direction of the screen, a problem of the projected image arises, since the size of the captured image of the person varies due to a change in the distance between the camera and the person. Frequent changes in the size of the person projected onto a screen increase unpleasantness of a person and, thus, the realistic sensation is reduced.

To display the real-size image of a person, the size of the image can be manually changed. However, it is troublesome to send an instruction to change the display size each time the person moves in the front-rear direction and, thus, it is difficult to have a smooth communication.

SUMMARY OF THE INVENTION

The present disclosure provides a scheme that allows smooth communication with a person at a remote site without giving unpleasantness caused by a significant change in the size of the projected image of the person.

According to an aspect of the present disclosure, a remote communication system includes a first projector configured to project one or more images transmitted from a remote site onto a first projection plane; at least one image capturing unit disposed on the first projection plane, the at least one image capturing unit operating to capture an image; an extraction unit configured to extract a person part image from the image captured by the at least one image capturing unit, a scaling unit configured to scale the image captured by the at least one image capturing unit in accordance with a distance from the at least one image capturing unit to a person serving as a subject, and a second projector configured to project, onto a second projection plane disposed at or in the remote site, the image, which is subject to the extraction by the extraction unit and which is scaled by the scaling unit.

According to other aspects of the present disclosure, one or more additional remote communication systems, one or more remote communication apparatuses, one or more control methods and one or more storage mediums are discussed herein. Further features of the present disclosure will become apparent from the following description of exemplary embodiments with reference to the attached drawings.

DESCRIPTION OF THE EMBODIMENTS

An exemplary embodiment of the present disclosure is described in detail below with reference to the accompanying drawings. The following description of the exemplary embodiment is merely illustrative in nature and is in no way intended to limit the disclosure and/or invention defined by the claims. All of the features and the combinations thereof described in the embodiment are not necessarily essential to the disclosure.

Figure 1A:
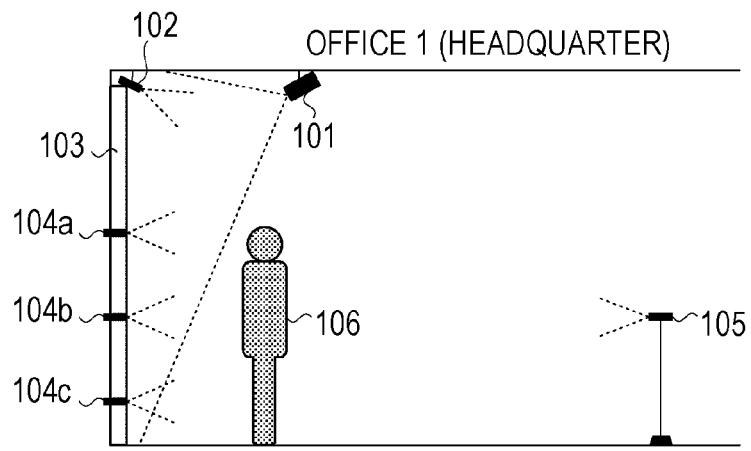
FIGS. 1A to 1C are cross-sectional views of a remote communication system according to an exemplary embodiment of the present disclosure.
Figure 1B:
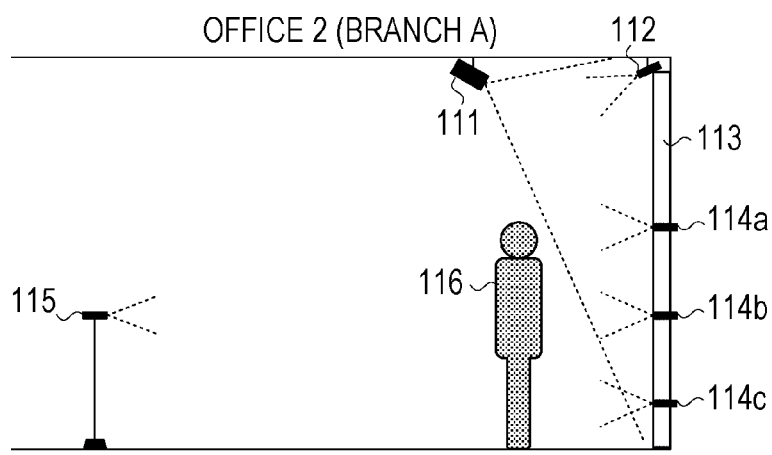
Figure 1C:
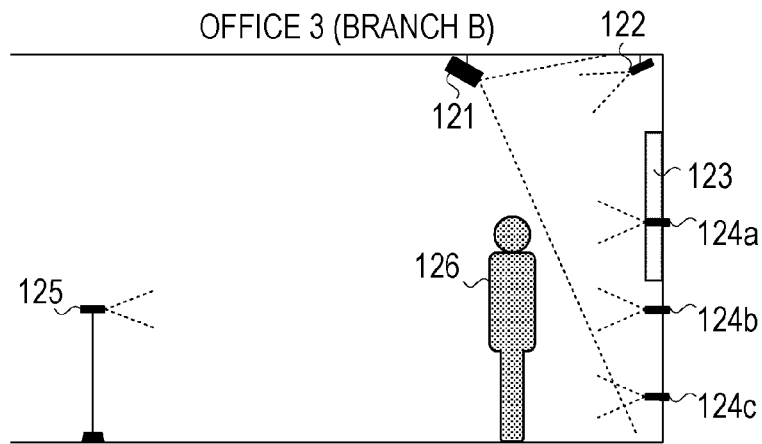

FIGS. 1A to 1C are cross-sectional views of a remote communication system according to the present disclosure. By using the remote communication system, communication can be performed between an office 1 disposed in a headquarter and an office 2 disposed on a blanch A or between the office 1 and an office 3 disposed in a branch B. Note that while the description is given with reference to three offices as an example, communication may be performed only between two offices, that is, the office 1 and the office 2. In addition, all the offices may be referred to as a "remote communication system". Alternatively, only the configuration included in a single office may be referred to as a "remote communication system".

In addition, the offices described herein may be separated so that the time required to move from one of the offices to the other is several hours, or the offices may be different conference rooms in the same building. That is, the term "remote" refers to physically different spaces and does not define the physical distance and the time length required for movement from one place to another place.

The office 1 illustrated in FIG. 1A includes a projector 101, a background camera 102, a screen 103, front cameras 104, and a back camera 105. The projector 101 is a projection device that projects the image captured in one of the other offices onto the screen 103. The screen 103 serves as a projection plane that displays the image projected by the projector 101. Note that the screen 103 may be a screen temporarily placed when communication is performed with one of the other offices. Alternatively, a wall of the office may serve as the screen 103. In addition, while the present exemplary embodiment is described with reference to an example in which the projector and the screen are used to display an image, the image may be displayed using a large liquid crystal display.

The front cameras 104 are front image capturing devices disposed in front of a person 106 to capture the images of the person 106. In this example, to capture the image of the whole body of the person 106, three front cameras 140, that is, front cameras 104a, 104b, and 104c are employed. However, at least one front camera can be employed. The process related to capturing the image of the person 106 using the front cameras 104 is described in more detail below.

The background camera 102 is a background image capturing device that captures the background image of the person 106 (i.e., the image taken in the right direction in FIG. 1A). In this example, the office 1 is not a room dedicated to remote communication, but is an ordinary office room for everyday business. The background image captured by the background camera 102 contains the images of desks, chairs, and cabinets of employees and the image of a person who is conducting another business transaction. By projecting such a background image together with the image of the person captured by the front cameras 104, a simulated environment as if people stood and chatted with one another in the corner of the office room can be produced. Note that to prevent the background image (an object) from being hidden by the image of the person 106, it is desirable that the background camera 102 be mounted on the upper section of the room in the vertical direction (near the ceiling).

The back camera 105 is a back image capturing device for capturing the image of the person 106 or the image displayed on the screen 103 in the direction from the right to the left in FIG. 1A. Since the person 106 faces to the screen 103 (i.e., the left in FIG. 1A) during remote communication, the back camera 105 captures the image of the person 106 from behind. Note that the distance between the back camera 105 and the person 106 is longer than the distance between the front camera 104 and the person 106. Accordingly, the back camera 105 can capture the image of the entire body of the person 106.

The front camera 104 includes a range sensor for detecting the distance from the front camera 104 to the subject. The image captured by the front camera 104 includes an RGB color image with 8 bits per channel and 3 channels and a range image with 8 bits per channel and 1 channel. In contrast, each of the background camera 102 and the back camera 105 does not include a range sensor. Accordingly, an image captured by each of the background camera 102 and the back camera 105 includes an RGB color image with 8 bits per channel and 3 channels, but does not include a range image. Note that the images captured by each of the front camera 104, the background camera 102, and the back camera 105 are time-series still images, which are sequentially projected in a remote site. In this manner, the images are played back in the form of a moving image.

Like the office 1, in the office 2 in which a person 116 is located (FIG. 1B), equipment similar to that in the office 1 (i.e., a projector 111, a background camera 112, a screen 113, a front camera 114, and a back camera 115) is provided. In addition, in the office 3 in which a person 126 is located (FIG. 1C), equipment similar to that in the office 1 or 2 (i.e., a projector 121, a background camera 122, a screen 123, a front camera 124, and a back camera 125) is provided. Note that each of the screens 103 and 113 measures 2.3 meters high by 4 meters wide. In contrast, the screen 123 has a relatively smaller size and measures 1 meter high by 2 meters wide. When communication using a real-size projected image of the entire body is desirable, the offices 1 and 2 each having a large screen need to be used. However, if the space is limited, a small screen can be used as in the office 3. At that time, the image of the entire body of a person located in the remote site cannot be displayed on the screen 123. Thus, for example, the image of only the upper body of the person is projected on the screen 123.

Figure 2:
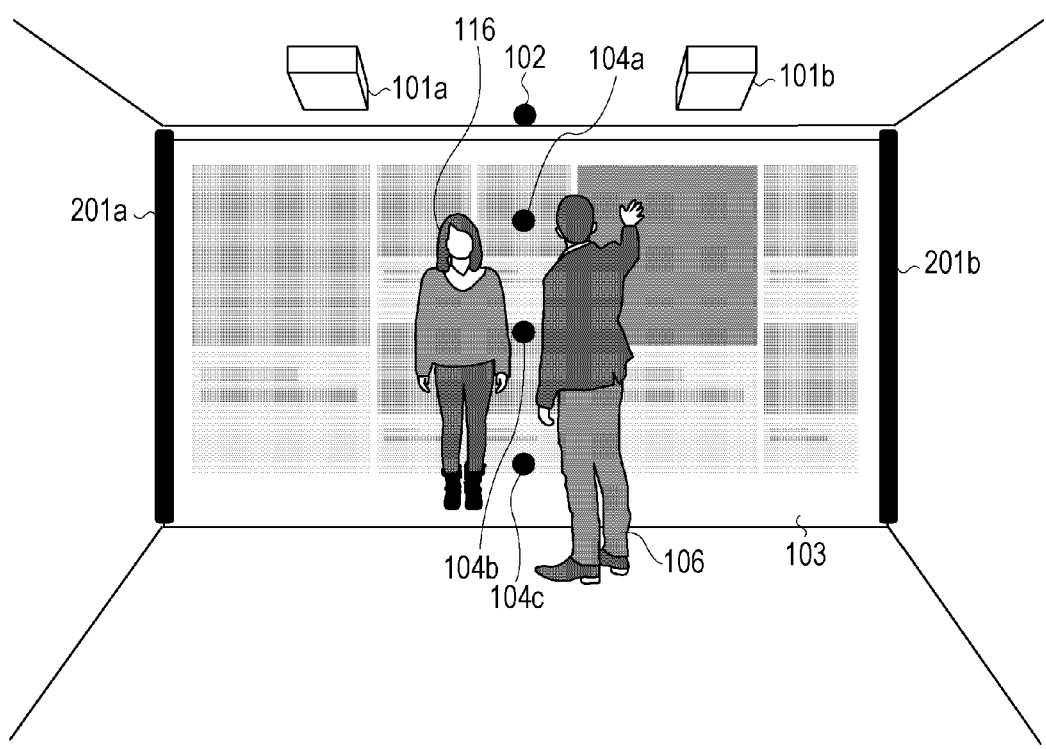
FIG. 2 is an external view of the remote communication system according to the exemplary embodiment of the present disclosure.

FIG. 2 is an external view of the remote communication system viewed in a direction from the right to the left in FIG. 1A. In FIG. 2, the person 106 located in the office 1 is communicating with the person 116 located in the office 2. Since as described above, the screen 103 is horizontally long, two projectors 101 (i.e., projectors 101a and 101b) are provided. However, a single projector may project the image. The background camera 102 is set in the upper middle of the screen 103. The front cameras 104a, 104b, and 104c are embedded in the screen 103 so as to be arranged in a line in the middle section of the screen 103 in the vertical direction.

A digitizer 201 is a detecting device that detects the operation performed on the screen 103 by a user. The digitizer 201 includes a transmitter 201a and a receiver 201b. If an infrared light beam projected by the transmitter 201a is blocked by, for example, part of the body of the person 106 or a pointer held by the person 106, the digitizer 201 outputs the coordinates of the position. Note that in this example, the transmitter 201a and the receiver 201b are disposed at the left and right ends of the screen 103, respectively. However, the transmitter 201a and the receiver 201b may be disposed at the upper and lower ends of the screen 103, respectively. In addition, a technique for detecting the operation performed by a user is not limited to a technique using a digitizer. For example, the screen 103 may have a touch panel function, and a position in the screen 103 at which the screen 103 is pressed may be detected.

The image of the person 116 captured by the front camera 114 set in the office 2 is projected onto the screen 103. In addition, in FIG. 2, a document (e.g., a conference material) stored in a document management server 340 (described below) is displayed as the background image of the person 116. It can be switched whether as the background of the person 116, a document stored in the document management server 340 is projected or the background image of the office 2 captured by the background camera 112 is projected in accordance with the operation performed by the person 116 and detected by the digitizer 201.

Figure 3:
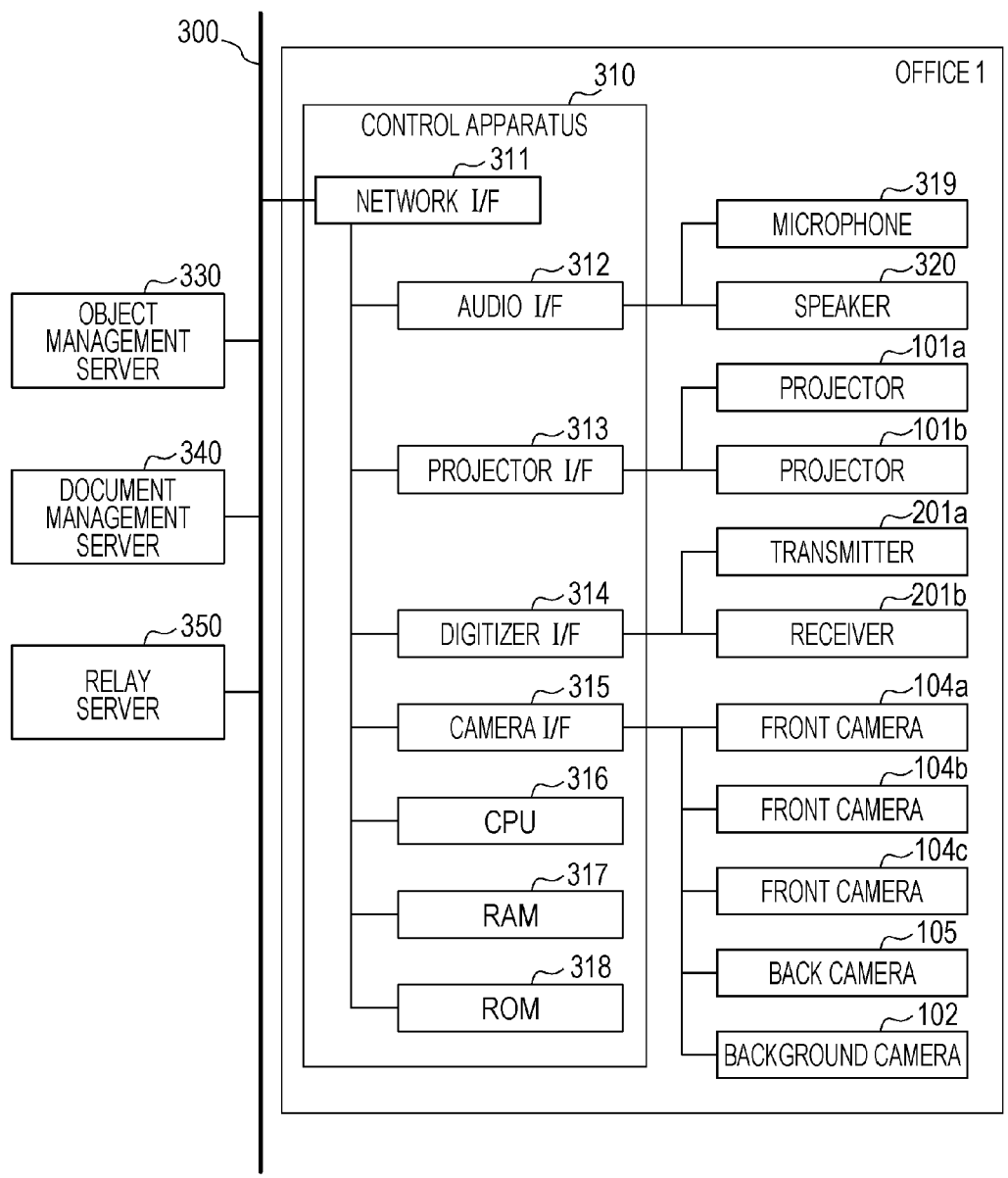
FIG. 3 is a hardware configuration diagram of the remote communication system according to the exemplary embodiment of the present disclosure.

FIG. 3 is a hardware configuration diagram of the remote communication system. A central processing unit (CPU) 316 included in a control apparatus 310 reads out a control program stored in a read only memory (ROM) 318 and controls the equipment provided in the office 1. A random access memory (RAM) 317 is used as temporary memory areas, such as a main memory and a work area of the CPU 316. Note that in the office 1, the CPU 316 uses a single memory (the RAM 317) and performs processes indicated by a flowchart described below. However, another form of processing can be employed. For example, a control apparatus 310 may be provided for each of the cameras, projectors, and digitizer. Thus, the processes may be performed by a plurality of CPUs and RAMs (or hard disk drives (HDDs) or solid state drives (SSDs)) that are in cooperation with one another. Alternatively, some of the processes described below may be performed by a hardware circuit, such as an application specific integrated circuit (ASIC).

The offices are connected to one another using a network 300. Any network selected from among a wired network, a wireless network, a wide area network (WAN), a local area network (LAN), a public line, and a dedicated line can be employed as the network 300 in accordance with the environment. To connect the office 1 to the network 300, a network interface (I/F) 311 is employed.

Each of the offices has a microphone and a speaker disposed therein (not illustrated in FIGS. 1A to 1C and FIG. 2). The speech emanated from a person in the office is converted into an audio signal by a microphone and is output from a speaker in a remote site. The office 1 has a microphone 319 and a speaker 320 disposed therein. To control the input of speech using the microphone 319 and the output of the speech using the speaker 320, an audio I/F 312 is employed.

To control projection of an image using the projector 101, a projector I/F 313 is employed. To control detection of the operation performed by a user using the digitizer 201, a digitizer I/F 314 is employed. To control the image capturing operations performed by the front camera 104, the back camera 105, and the background camera 102, a camera I/F 315 is employed.

Note that each of the offices 2 and 3 has a configuration that is the same as that of the office 1 (not illustrated). Examples of the above-mentioned interfaces include a universal serial bus (USB), a high definition multimedia interface (HDMI (trade name)), a wired LAN, and a wireless LAN, one of which is selected as needed.

When an image captured in each of the offices and speech input in an office are sent to the other offices, a relay server 350 relays the image and speech. The document management server 340 stores documents to be projected onto the screen by the projector in each of the offices (e.g., a conference material). As illustrated in FIG. 2, upon receiving an instruction to project a document together with the image of the person, the CPU 316 acquires the document from the document management server 340 and causes the projector 101 to project the document. Note that the instruction to project the document can be output from any one of the offices that perform remote communication.

When the screen 103 is used as an operation unit of the remote communication system, an object management server 330 stores objects to be projected onto the screen 103 by the projector 101. An example of the object is an operation button used to select one of the offices to be connected. If the remote communication system is started in the office 1, the CPU 316 acquires, from the object management server 330, selection buttons each corresponding to one of the offices and causes the projector 101 to project the selection buttons onto the screen 103. If the person 106 touches the screen 103, the digitizer 201 detects the coordinates of the touched position, and the CPU 316 identifies one of the selection buttons corresponding to the detected coordinates. Thereafter, the CPU 316 starts remote communication with the office corresponding to the identified selection button.

Figure 4:
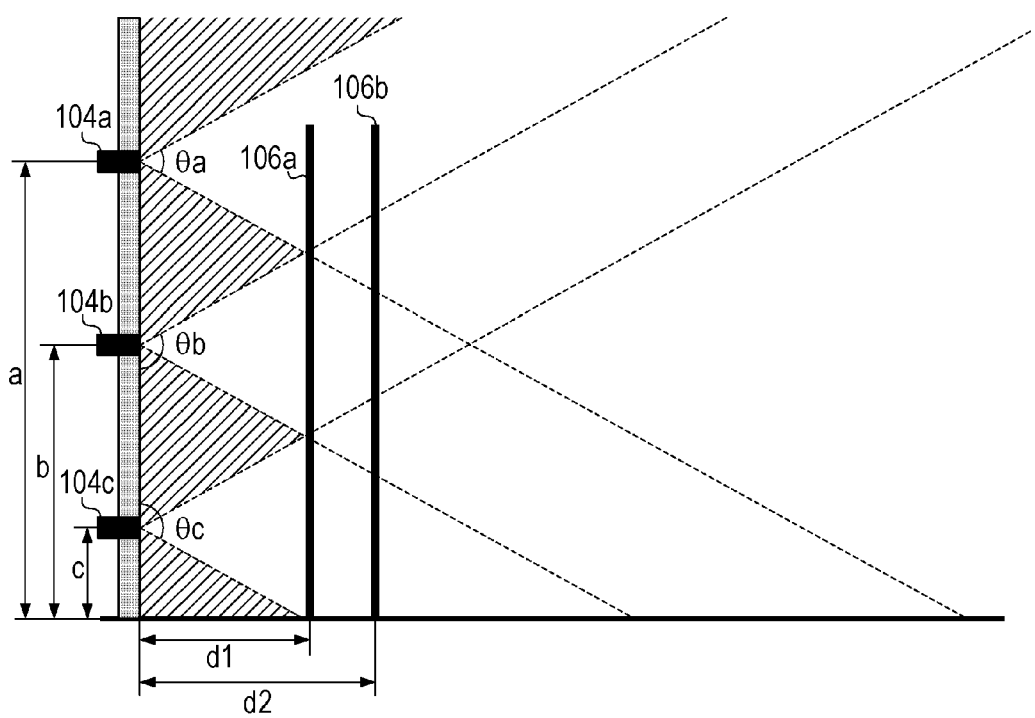
FIG. 4 illustrates the image capturing area of a front camera according to the exemplary embodiment of the present disclosure.

FIG. 4 illustrates the image capturing areas of the front cameras 104. The front cameras 104a, 104b, and 104c are set at heights of a (1750 mm), b (1050 mm), and c (350 mm) from the floor, respectively.

The angles of view of the front cameras 104a, 104b, and 104c in the vertical direction are $\theta a$, $\theta b$, and $\theta c$, respectively. In this example, $\theta a$, $\theta b$, and $\theta c$ are the same. A distance d from the front camera 104 to the person 106 is calculated on the basis of the range image captured by the front camera 104. In FIG. 4, the positions 106a and 106b of the person 106 indicate that the person 106 is moving toward the screen 103 in the front-rear direction. A distances d1 is the distance from the person 106 standing at the position of the person 106a to the front camera 104 (the screen 103), and a distances d2 is the distance from the person 106 standing at the position 106b to the front camera 104 (the screen 103). Note that the position 106a is the closest position to the screen 103 at which the entire body of the person 106 can be captured by the front camera 104. If the person 106 further moves closer to the screen 103, the person 106 is outside the angle of view of the front camera 104 and, thus, part of the image of the body of the person 106 disappears.

Figure 7:
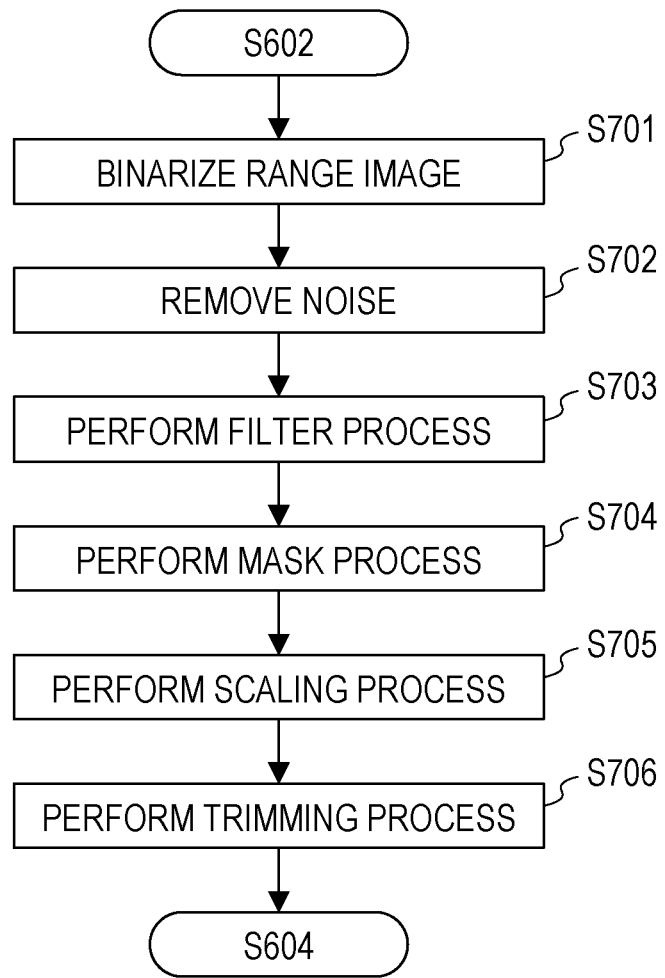
FIG. 7 is a flowchart of the process to capture the image of a person according to the exemplary embodiment of the present disclosure.

Scaling and trimming of the image captured by the front camera 104 is described next with reference to FIGS. 5A to 5F. According to the present exemplary embodiment, the position 106a at which the person 106 is standing is considered as a reference position. Even when the person 106 slightly moves back from the reference position, the image of the person 106 is projected so as to be displayed with the same image size as when the person 106 is located at the position 106a. Note that if the position 106b is away from the screen 103 by 2 meters or more, a process described below with reference to FIG. 7 is performed. Thus, the image of the person 106 is not projected.

If the person 106 stands at the position 106b, the size of the person in the images captured by each of the front cameras 104a, 104b, and 104c is smaller than that when the person 106 stands at the position 106a. In contrast, if the person 106 stands at the position 106a, the images captured by the front cameras 104a, 104b, and 104c do not overlap one another. However, if the person 106 stands at the position 106b, overlapping portions of the images appear.

Figure 5A:
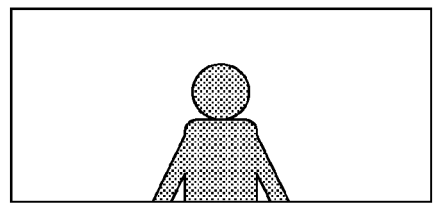
FIGS. 5A to 5F illustrate a scaling process and a trimming process according to the exemplary embodiment of the present disclosure.
Figure 5B:
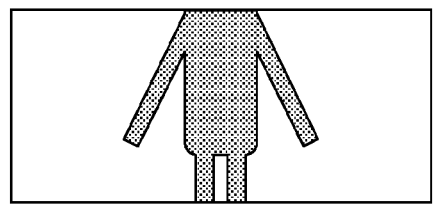
Figure 5C:
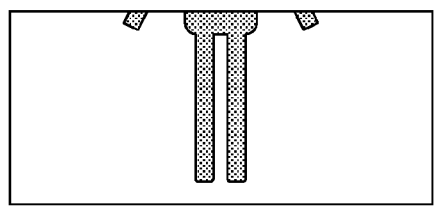
Figure 5D:
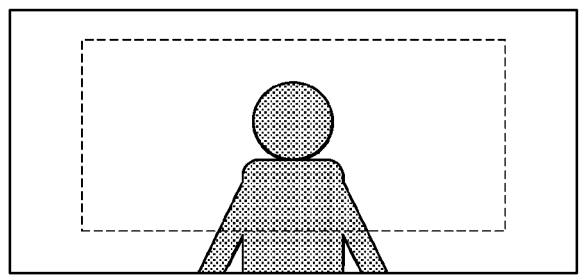
Figure 5E:
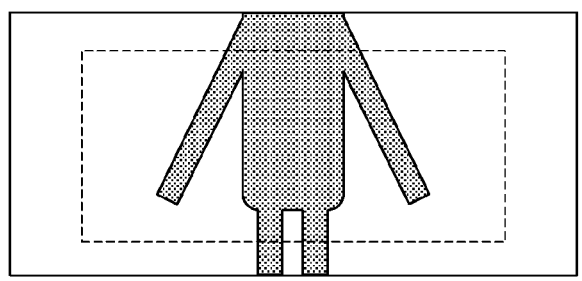
Figure 5F:
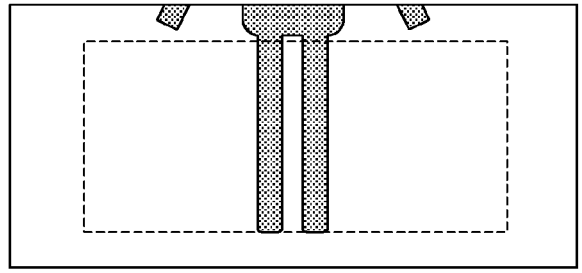

According to the present exemplary embodiment, by taking into account the above description, a scaling process and a trimming process are performed. The scaling process is described first. FIGS. 5A, 5B, and 5C illustrate the images captured by the front cameras 104a, 104b, and 104c when the person 106 stands at the position 106b, respectively. A scaling process is performed on the images using a scaling factor based on the distances d1 and d2. More specifically, the images illustrated in FIGS. 5A, 5B, and 5C are scaled (enlarged) by a value obtained by dividing the distance d2 by the distance d1. The images obtained as the result of the scaling process are illustrated in FIGS. 5D, 5E, and 5F.

The trimming process is described next. The central points of the images illustrated in FIGS. 5D, 5E, and 5F are considered as the reference points. An area of each of the images corresponding to the size of the image before the scaling process (a rectangular area enclosed by a dotted line in each of FIGS. 5D, 5E, and 5F) is maintained, and the other area is removed. In this manner, the overlapping areas among the images can be removed. The resultant images are sequentially combined and, thus, the image of the person can be obtained. At that time, the size of the combined image is the same as the size of the image of the person 106 captured when the person 106 is located at the position 106a, and the combined image of the person does not have any overlapping portion.

Figure 6:
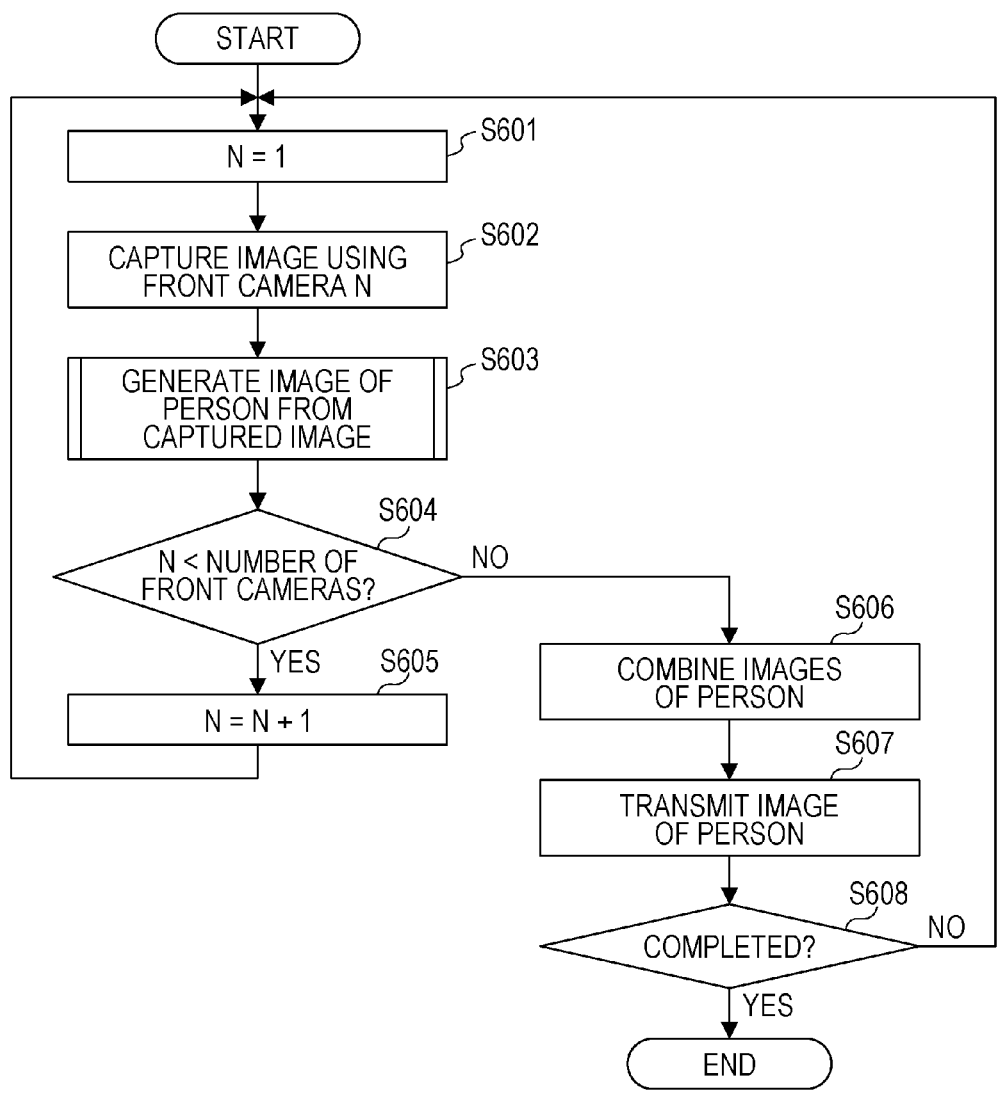
FIG. 6 is a flowchart of a process to capture the image of a person according to the exemplary embodiment of the present disclosure.

FIGS. 6 and 7 are flowcharts illustrating a process to capture the images of the person 106 using the front cameras 104 and a process to combine the images of the person captured by the front cameras 104. Each of operations (steps) indicated by the flowcharts in FIGS. 6 and 7 is realized by the CPU 316 that is disposed in the office 1 and that executes a control program stored in the ROM 318.

In step S601, the value of a variable N is initialized to 1. In step S602, among the front cameras 104a, 104b, and 104c, the CPU 316 instructs the front camera 104 corresponding to the variable N to capture the image of the person 106. In step S603, the image of only the person 106 is generated from the image captured by the front camera 104.

FIG. 7 is a flowchart illustrating the process performed in step S603 in detail. In step S701, a range image included in the captured image obtained in step S602 is binarized. According to the present exemplary embodiment, the person 106 stands at a position in the range from the position away from the screen 103 (the front camera 104) by 1 meter to the position away from the screen 103 by 2 meters. Accordingly, a minimum value of the distance from the front camera 104 to the subject is set to 1 meter, and the maximum value of the distance is set to 2 meters. In this manner, a predetermined range is set. In addition, for each of the pixels of the range image, the value of the pixel is changed to 255 if the value is within the predetermined range. The values of the other pixels are set to 0.

In step S702, an erosion process that replaces the value of the pixel of interest with 0 under the condition that at least one pixel in the neighborhood is 0 or a dilation process that replaces the value of the pixel of interest with 255 under the condition that at least one pixel in the neighborhood is 255 is performed. In this manner, isolated point noise can be removed. In step S703, a smoothing filter process (e.g., a Gaussian filter process) is performed to smooth the outline of an area where pixels each having a value of 255 are continuously arranged.

In step S704, a mask process is performed. Thus, a pixel of the color image corresponding to a pixel of the range image having a value of 255 is made non-transparent, and a pixel of the color image corresponding to a pixel of the range image having a value of 0 is made fully transparent (is transparentized). Through the process, the image of a person part is extracted from the image captured by the front camera 104. As used herein, the term "person part" refers to not only the image of a person but the image of the person and, for example, a pointer or a product sample held by the person.

In step S705, as illustrated in FIGS. 5A to 5F, the scaling process is performed on the images of the person illustrated in FIGS. 5A, 5B, and 5C to generate the images of the person illustrated in FIGS. 5D, 5E, and 5F, respectively. In addition, in step S706, as illustrated in FIGS. 5A to 5F, the trimming process is performed on the images of the person illustrated in FIGS. 5D, 5E, and 5F.

Referring back to FIG. 6, in step S604, it is determined whether the value of the variable N is less than the number of the front cameras 104 (3 according to the present exemplary embodiment). If the value of the variable N is less than the number of the front cameras 104, the processing proceeds to step S705, where a value of 1 is added to the variable N. Thereafter, the processing returns to step S601. However, if the value of the variable N is not less than the number of the front cameras 104 (the value of the variable N is equal to the number of the front cameras 104), the processing proceeds to step S606.

In step S606, the images of the person subjected to the process performed in step S603 are combined. In addition, since after the combining process, a blank (a space above the head, a space on the left of the right hand, a space on the right of the left hand, and a space under the feet) is left in the combined image, the trimming process is performed on a rectangular area including the pixels each having a value of 255.

In step S607, the image obtained through the process performed in step S606 is transmitted to the office 2 that is connected to the office 1. In step S608, it is determined whether an instruction to complete the remote communication is received. If an instruction to complete the remote communication is received, the processing is completed. However, if an instruction to complete the remote communication is not received, the processing returns to step S601. Thereafter, the processes in step S601 and the subsequent steps are performed again.

Note that in this example, the processes in steps S603 and S606 are performed on the image capturing side (the office in which a person representing the subject is located). However, the processes may be performed in the office on the projection side (the office in which the captured image is projected). In addition, the extraction process of the person part described in steps S701 to S704 may be performed after the combining process described in step S606. Furthermore, although description is not given in this example, the image captured by the background camera 102 and the image captured by the back camera 105 are transmitted to the office 2 that is connected to the office 1, synchronously or asynchronously with the transmission of the image performed in step S607.

Figure 8:
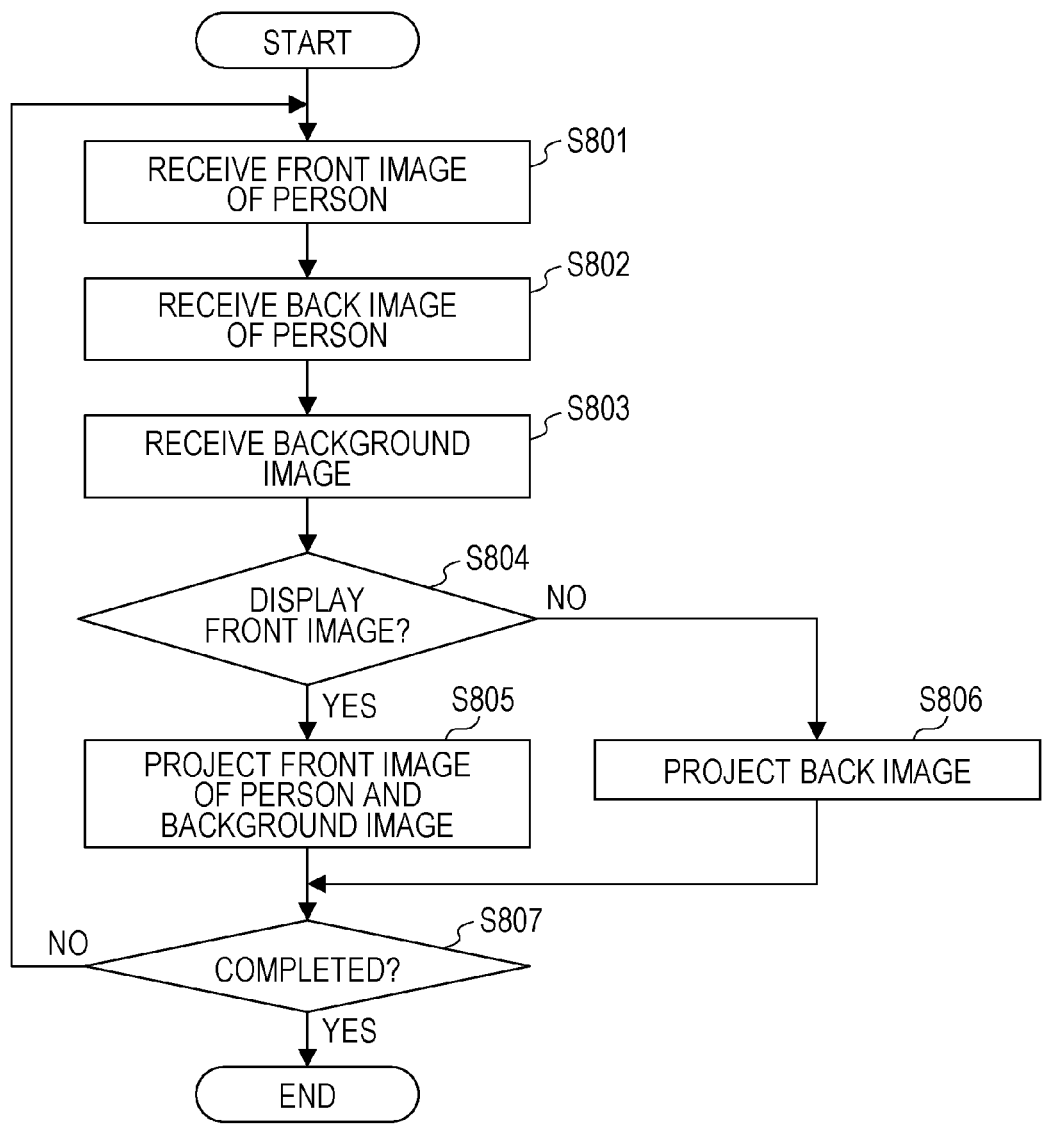
FIG. 8 is a flowchart of a process to project an image according to the exemplary embodiment of the present disclosure.

FIG. 8 is a flowchart of a process to project the image transmitted from an office connected to the office. Each of operations (steps) illustrated in FIG. 8 is realized by the CPU 316 that is disposed in the office 1 and that executes a control program stored in the ROM 318. Note that in this example, the processes described with reference to FIGS. 6 and 7 are performed in the office 2 by, for example, the CPU provided in the office 2 in the same manner, and the resultant images transmitted from the office 2 are projected in the office 1.

In step S801, the front image of a person captured by the front camera 114 is received. In step S802, the back image of the person captured by the back camera 115 is received. In step S803, the background image captured by the background camera 112 is received.

In step S804, it is determined whether an instruction to display the front image of the person is received or an instruction to display the back image of the person is received. The instructions are received in accordance with the operation performed by the person 106 and detected by the digitizer 201. If it is determined that an instruction to display the front image of the person is received, the processing proceeds to step S805, where the front image of the person received in step S801 and the background image received in step S803 are projected onto the screen 103. However, if it is determined that an instruction to display the back image of the person is received, the processing proceeds to step S806, where the back image of the person received in step S802 is projected onto the screen 103.

In step S807, it is determined whether an instruction to complete the remote communication is received. If it is determined that an instruction to complete the remote communication is received, the processing is completed. However, if it is determined that an instruction to complete the remote communication is not received, the processing returns to step S801. Thereafter, the processes in step S801 and the subsequent steps are performed again. Note that the processes in the flowchart illustrated in FIG. 6 and the processes in the flowchart illustrated in FIG. 8 are continuously and concurrently performed during remote communication.

As described above, the remote communication system according to the present exemplary embodiment includes the projector 101 that projects, onto the screen 103, the image transmitted from the office 2 located in a remote site. In addition, the screen 103 has a plurality of the front cameras 104 disposed therein. The CPU 316 performs an extraction process that extracts a person part from each of the images captured by the front cameras 104 (refer to step S703) and a combining process that combines the plurality of images captured by the front cameras 104 (refer to step S706). Furthermore, the remote communication system includes the projector 111 that projects, onto the screen 113 disposed in the office 2, the image subjected to the extraction process and the combining process.

By having such a configuration, communication can be smoothly performed with a remote site without providing unpleasantness caused by a significant change in the size of the projected image of a person.

Other Exemplary Embodiment

In addition, the present disclosure can be realized by performing the following processes. That is, the processes are providing a storage medium including software program code that realizes the functions of the above-described exemplary embodiment to a system or an apparatus and reading out the program code stored in the storage medium using a computer (a CPU or an MPU) in the system or the apparatus.

In such a case, the program code itself read from the storage medium realizes the functions of the above-described exemplary embodiment and, thus, the program code and the storage medium storing the program code constitutes at least one embodiment of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-095888 filed May 8, 2015, which is hereby incorporated by reference herein in its entirety.

What is claimed is:

1. A remote communication system comprising:
    a first projector configured to project one or more images transmitted from a remote site onto a first projection plane;
    at least one image capturing unit disposed on the first projection plane, the at least one image capturing unit operating to capture an image, and the at least one image capturing unit comprising a plurality of image capturing units disposed on the first projection plane;
    an extraction unit configured to extract a person part image from the image captured by the at least one image capturing unit;
    a scaling unit configured to scale the image captured by the at least one image capturing unit in accordance with a distance from the at least one image capturing unit to a person serving as a subject, to make a size of the person part image by the extraction unit become a predetermined size, wherein a scaling size of the image captured by the at least one image capturing unit is determined so that a size of the person serving as the subject looks substantially fixed even if the person serving as the subject moves away from the at least one image capturing unit, and wherein the image that undergoes the extraction and the scaling comprises a plurality of images each captured by one of the plurality of image capturing units;
    a second projector configured to project, onto a second projection plane disposed in the remote site, the image, which is subjected to the extraction by the extraction unit and which is scaled by the scaling unit; and
    a combining unit configured to combine the plurality of images each captured by one of the plurality of image capturing units.

2. The remote communication system according to claim 1, wherein the scaling unit scales the person part image extracted by the extraction unit.

3. The remote communication system according to claim 1, wherein the extraction unit makes a pixel having a distance from the at least one image capturing unit to the subject transparent.

4. The remote communication system according to claim 1, wherein the combining unit further operates to at least one of:
    (i) delete overlapping parts among the plurality of images and combine the plurality of images into the image to be projected by the second projector; and (ii) combine person parts images that are extracted from each of the plurality of images.

5. The remote communication system according to claim 1, further comprising:
a background image capturing unit configured to capture an image of a background,
wherein the second projector projects the image, which is subject to the extraction by the extraction unit and which is scaled by the scaling unit, together with the image of the background captured by the background image capturing unit.

6. The remote communication system according to claim 1, further comprising:
a detecting unit configured to detect an operation performed on the first projection plane by a user; and
a switching unit configured to switch among the one or more images projected by the first projector in accordance with the operation performed by the user and detected by the detecting unit.

7. A remote communication system comprising:
a projector configured to project one or more images transmitted from a remote site onto a projection plane;
at least one image capturing unit disposed on the projection plane, the at least one image capturing unit operating to capture an image, and the at least one image capturing unit comprising a plurality of image capturing units disposed on the projection plane;
an extraction unit configured to extract a person part image from the image captured by the at least one image capturing unit;
a scaling unit configured to scale the image captured by the at least one image capturing unit in accordance with a distance from the at least one image capturing unit to a person serving as a subject, to make a size of the person part image by the extraction unit become a predetermined size, wherein a scaling size of the image captured by the at least one image capturing unit is determined so that a size of the person serving as the subject looks substantially fixed even if the person serving as the subject moves away from the at least one image capturing unit, and wherein the image that undergoes the extraction and the scaling comprises a plurality of images each captured by one of the plurality of image capturing units;
a transmitter configured to transmit the image, which is subjected to the extraction by the extraction unit and which is scaled by the scaling unit, to the remote site; and
a combining unit configured to combine the plurality of images each captured by one of the plurality of image capturing units.

8. The remote communication system according to claim 7,
wherein the person parts image comprises a plurality of person parts images that are extracted from the plurality of images captured by the one of the plurality of image capturing units, and
wherein the scaling unit scales the extracted person parts images.

9. The remote communication system according to claim 7, wherein the combining unit further operates to at least one of:
(i) delete overlapping parts among the plurality of images and combine the plurality of images into the image to be transmitted by the transmitter; and
(ii) combine person parts images that are extracted from each of the plurality of images.

10. A method for controlling a remote communication system, the remote communication system including a projector configured to project one or more images transmitted from a remote site onto a projection plane and at least one image capturing unit disposed on the projection plane, the at least one image capturing unit operating to capture an image, and the at least one image capturing unit comprising a plurality of image capturing units disposed on the projection plane, the method comprising:
extracting a person part image from the image captured by the at least one image capturing unit;
scaling the image captured by the at least one image capturing unit in accordance with a distance from the at least one image capturing unit to a person serving as a subject, to make a size of the extracted person part image become a predetermined size, wherein a scaling size of the image captured by the at least one image capturing unit is determined so that a size of the person serving as the subject looks substantially fixed even if the person serving as the subject moves away from the at least one image capturing unit, and wherein the image that undergoes the extraction and the scaling comprises a plurality of images each captured by one of the plurality of image capturing units;
transmitting the image, which is subjected to the extracting and scaling steps, to the remote site; and
combining the plurality of images each captured by one of the plurality of image capturing units.

11. The method according to claim 10,
wherein the person parts image comprises a plurality of person parts images that are extracted from the plurality of images captured by the one of the plurality of image capturing units, and
wherein the scaling step further includes scaling the extracted person parts images.

12. The method according to claim 10, wherein the combining step further includes at least one of:
(i) deleting overlapping parts among the plurality of images and combining the plurality of images into the transmitted image; and
(ii) combining the person parts images that are extracted from each of the plurality of images.

13. A non-transitory computer-readable storage medium storing a program that causes a computer to perform a method for controlling a remote communication system including a projector configured to project one or more images transmitted from a remote site onto a projection plane and at least one image capturing unit disposed on the projection plane, the at least one image capturing unit operating to capture an image, and the at least one image capturing unit comprising a plurality of image capturing units disposed on the projection plane, the method comprising:
extracting a person part image from the image captured by the at least one image capturing unit;
scaling the image captured by the at least one image capturing unit in accordance with a distance from the at least one image capturing unit to a person serving as a subject, to make a size of the person part image by the extraction unit become a predetermined size, wherein a scaling size of the image captured by the at least one image capturing unit is determined so that a size of the person serving as the subject looks substantially fixed even if the person serving as the subject moves away from the at least one image capturing unit, and wherein the image that undergoes the extraction and the scaling comprises a plurality of images each captured by one of the plurality of image capturing units;
transmitting the image, which is subjected to the extracting and scaling steps, to the remote site; and
combining the plurality of images each captured by one of the plurality of image capturing units.

14. The non-transitory computer-readable storage medium according to claim 13,
wherein the person parts image comprises a plurality of person parts images that are extracted from the plurality of images captured by the one of the plurality of image capturing units, and
wherein the scaling step further includes scaling the extracted person parts images.

15. The non-transitory computer-readable storage medium according to claim 13, wherein the combining step further includes at least one of:
   (i) deleting overlapping parts among the plurality of images and combining the plurality of images into the transmitted image; and
   (ii) combining person parts images that are extracted from each of the plurality of images.

16. The remote communication system according to claim 1, wherein the scaling unit scaling the captured image in a scaling size value which is related to $D2/D1$, where $D1$ is the closest distance from the closest position to the screen at which the entire body of the person serving as the subject can be captured by the image capturing unit and $D2$ is a distance from the person serving as the subject captured by the image capturing unit to the screen.

* * * * *